(12) United States Patent
Ramaswamy et al.

(10) Patent No.: US 6,993,685 B2
(45) Date of Patent: Jan. 31, 2006

(54) TECHNIQUE FOR TESTING PROCESSOR INTERRUPT LOGIC

(75) Inventors: Karthik Ramaswamy, Sunnyvale, CA (US); Kent Dickey, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 653 days.

(21) Appl. No.: 10/241,453

(22) Filed: Sep. 12, 2002

(65) Prior Publication Data

US 2004/0078678 A1    Apr. 22, 2004

(51) Int. Cl.
*G06F 11/00* (2006.01)
(52) U.S. Cl. ......................................... 714/43; 710/264
(58) Field of Classification Search .................. 714/43, 714/30; 710/264, 262, 265, 107, 111, 113–116, 710/119, 121–123, 240, 244
See application file for complete search history.

(56) References Cited

U.S. PATENT DOCUMENTS

| | | | | |
|---|---|---|---|---|
| 4,839,800 A | * | 6/1989 | Barlow et al. | 710/264 |
| 5,193,195 A | * | 3/1993 | Miyazaki | 710/262 |
| 5,280,618 A | * | 1/1994 | Takagi | 710/260 |
| 5,659,759 A | * | 8/1997 | Yamada | 710/265 |
| 6,061,757 A | * | 5/2000 | Arimilli et al. | 710/264 |
| 6,081,867 A |   | 6/2000 | Cox | |
| 6,167,479 A | * | 12/2000 | Hartnett et al. | 710/260 |
| 6,356,998 B2 | * | 3/2002 | Roche | 712/244 |

OTHER PUBLICATIONS

IBM Tech. Disc. Bull., "Diagnostic Interrupt Logic Testing", Oct. 1990, vol. 33, No. 5, pp. 80-81.*

* cited by examiner

*Primary Examiner*—Scott Baderman

(57) ABSTRACT

In a technique for testing processor interrupt logic, interrupts are sent to a microprocessor under test in a random order to test the processor interrupt logic of the microprocessor under test. The processor interrupt logic is considered to have failed the test if the microprocessor under test services a new interrupt having a priority level equal to or lower than a priority level of a previously received interrupt being serviced just prior to the receipt of the new interrupt. Furthermore, pseudo-masked interrupts are included in the interrupts being sent to the microprocessor under test. If a pseudo-masked interrupt is serviced by the microprocessor under test, the processor interrupt logic is considered to have failed the test. On the other hand, if the pseudo-masked interrupt is not serviced by the microprocessor under test, a lower (that is, soft) limit of the pseudo-masked interrupts is increased to that of the received pseudo-masked interrupt which has not been serviced by the microprocessor under test.

33 Claims, 4 Drawing Sheets

TECHNIQUE FOR TESTING PROCESSOR INTERRUPT LOGIC

BACKGROUND OF THE INVENTION

Microprocessor-based systems are configured to operate by sequentially executing software program instructions which may be stored in consecutive memory locations. A program counter, for example, may be configured to contain a memory address of a next stored instruction in the sequence of instructions. The program counter is then incremented as each instruction is executed. The software program may include branches which are taken in accordance with the conditions specified in the program. For a conditional branch, if the condition is satisfied, a branch address may be entered in the program counter and the sequential execution of instructions resumes, beginning at the branch address.

Microprocessor-based systems, however, must respond to the occurrence of events which are not in synchronism with respect to the stored software program. For example, data from a peripheral device, such as a mouse or keyboard, should be processed immediately upon data acquisition. Accordingly, microprocessors are provided with the capability of receiving and operating in accordance with one or more interrupt signals generated by such peripheral devices, for example. In response to such interrupt signals, the microprocessor is configured to interrupt the sequential sequence of instructions being executed and instead to begin to execute a another sequential sequence of instructions, commonly referred to as an interrupt service routine, corresponding to the interrupt being serviced.

To begin executing the interrupt service routine, the address presently stored in the program counter is saved and a vector address, sometimes referred to as an interrupt vector, is inputted to and stored by the program counter. There are two alternative techniques for determining the vector address for executing the interrupt service routine. In one technique, the peripheral device causing the interrupt provides the starting address of the interrupt service routine and the starting address is inputted to and stored by the program counter of the microprocessor. The address stored in the program counter can also be an address of a location in the memory which contains the starting address of the interrupt service routine. In another technique, the vector address points to a predetermined location in the memory which is typically the starting address of a software routine referred to as an interrupt handler. The interrupt handler then initiates an interrupt service routine corresponding to the interrupt being serviced.

Upon completion of the execution of the interrupt service routine, the previously saved address is inputted to and stored by the program counter and the execution of the original sequence of instructions resumes.

When two or more interrupt signals are pending, the microprocessor must respond to these interrupt signals on a priority interrupt basis. Microprocessor-based systems accordingly are given the ability to prioritize the interrupt signals. Furthermore, if the microprocessor is performing a critical operation that cannot be interrupted, the microprocessor may be configured so as to ignore one or more interrupt signals. For this reason, microprocessors are configured to include a mechanism, referred to as processor interrupt logic, for masking interrupts based on their priority interrupt level.

The processor interrupt logic for masking interrupts based on the priority interrupt level determines the priority interrupt level of the interrupt being serviced and masks all interrupts which have the same priority interrupt level or a lower priority interrupt level than the interrupt being serviced. The processor interrupt logic for masking interrupts based on interrupt priority level is quite complicated and accordingly, a technique must be provided for testing processor interrupt logic to ensure that it is operating properly.

SUMMARY OF THE INVENTION

In one aspect of the invention, interrupts are sent to a microprocessor under test in a random order to test the processor interrupt logic of the microprocessor under test. The processor interrupt logic is considered to have failed the test if the microprocessor under test services a new interrupt having a priority interrupt level equal to or lower than an interrupt priority level of a previously received interrupt being serviced just prior to the receipt of the new interrupt.

In another aspect of the invention, pseudo-masked interrupts are included in the interrupts being sent to the microprocessor under test. If a pseudo-masked interrupt is serviced by the microprocessor under test, the processor interrupt logic is considered to have failed the test. On receiving a pseudo-masked interrupt, the soft limit is moved (increased) to the received interrupt (pseudo-masked). If a masked "pseudo-masked" interrupt is serviced, the test failed.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The Following Represents Brief Descriptions of the Drawings, Wherein.

DETAILED DESCRIPTION

Figure 1:
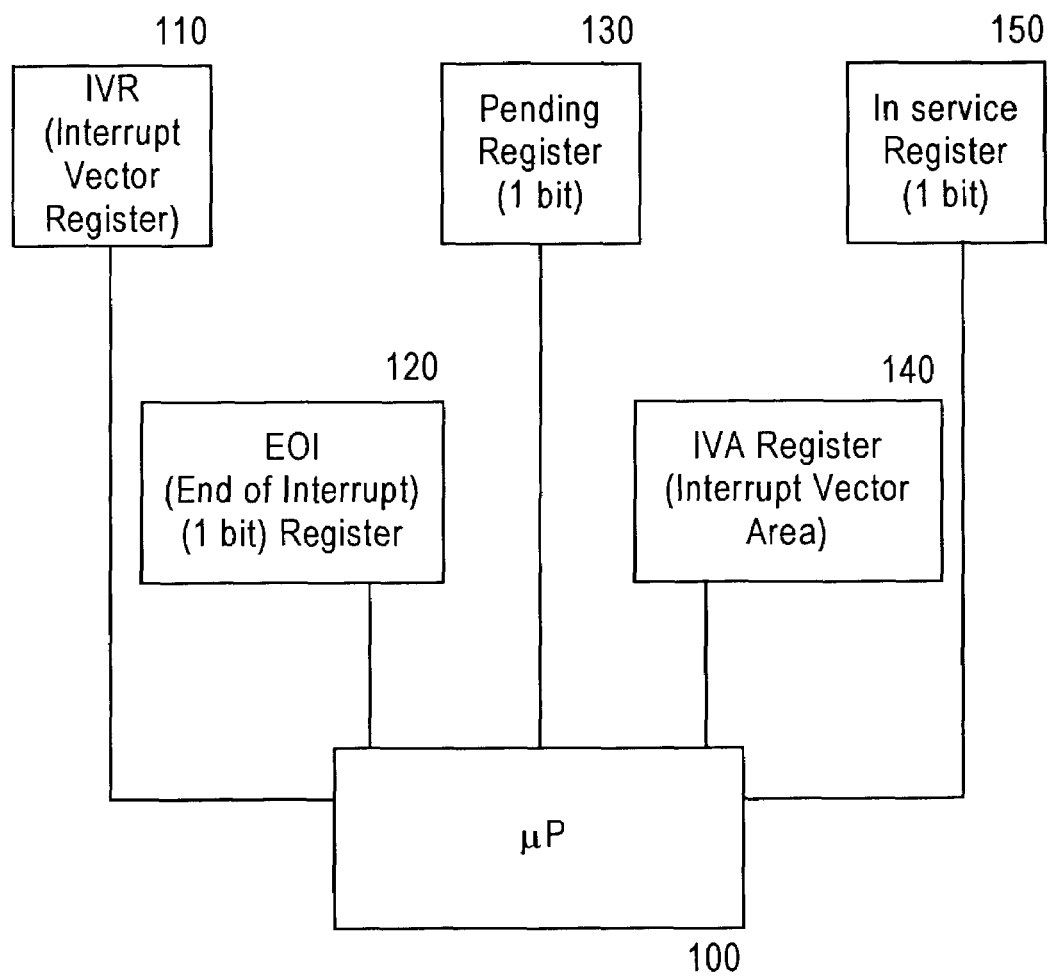
FIG. 1 is a partial block diagram of a microprocessor and the interrupt registers associated therewith.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Arrangements may be shown in block diagram form in order to avoid obscuring the invention, and also in view of the fact that specifics with respect to implementation of such block diagram arrangements are highly dependent upon the platform within which the present invention is to be implemented and such specifics are well within the purview of when skilled in the art. Where specific details have been set forth in order to describe example embodiments of the invention, it should be apparent to one skilled in the art that the invention can be practiced without, or with variations of, these specific details. Finally, it should be apparent that differing combinations of hard-wired circuitry and software instructions can be used to implement embodiments of the present invention, that is, the present invention is not limited to any specific combination of hardware and software.

To test the processor interrupt logic in a microprocessor in accordance with an example embodiment in accordance with the present invention, a test protocol is devised to send a predetermined number of instructions to the microprocessor under test, the predetermined number of instructions including interrupts of various priority classes randomly interspersed therebetween. If the microprocessor interrupt logic is operating properly, then it will ignore interrupts of a priority equal to or lower than the priority of the interrupt that it is presently servicing. On the other hand, if the microprocessor interrupt logic is not operating properly, that is, if there is a "bug" in the interrupt logic, then it may improperly service interrupts of a priority equal to or lower than the priority of the interrupt that it is presently servicing. In such a situation, it would be desirable to have the test protocol generate an ERROR message to indicate that the processor interrupt logic of the microprocessor under test has failed.

The following is a brief discussion of the details of the operation of the processor interrupt logic of a microprocessor.

As an example, a microprocessor may be configured to service interrupts having 256 different levels, the interrupts numbered 0–255. These 256 interrupts may be divided into 16 priority classes of interrupts, each class containing 16 interrupts. Accordingly, the lowest priority class 0 includes interrupts 0–15, the next higher priority class 1 includes interrupts 16–31, etc. Each interrupt in a priority class has the same priority level as all of the other interrupts in that priority class. Interrupts 0–15 are often reserved for particular special uses, and therefore, for this example, the technique for testing processor interrupt logic will only test interrupts 16–255. The microprocessor prioritizes interrupts so as to service the interrupt of the highest priority class prior to servicing interrupts of lower priority classes. The microprocessor is configured to service the first received interrupt of a particular priority class prior to servicing subsequently received interrupts of the same priority class.

FIG. 1 is a partial block diagram of a microprocessor and the interrupt registers associated therewith. As illustrated therein, a microprocessor 100 has several interrupt registers associated therewith, namely, an IVR (Interrupt Vector Register) 110, an EOI (End of Interrupt) register 120, a Pending register 130 one bit per interrupt, an IVA (Interrupt Vector Area) register 140 and an In-service register 150 one bit per interrupt.

The IVR 110, which is visible to software, is an 8-bit register for the example microprocessor 100 having 256 interrupts. The IVR 110 acts like a FIFO (First In, First Out) memory in that when the software reads once from the IVR 110, it outputs the stored value and upon the next software read command to the IVR 110, the next value stored in the IVR 110 is output.

The Pending register 130, which is a one-bit register for the example microprocessor 100, is set to "1" if an interrupt is pending and is set to "0" if no interrupt is pending.

The In-service register 150, which is a one-bit register for the example microprocessor 100, is set to "1" if an interrupt is in service. Note that if an interrupt is in service, the Pending register 130 is set to "0" unless a second interrupt was generated.

The EOI register 120, which is a one-bit register for the example microprocessor 100, is set to "1" by the software to indicate that the interrupt service routine has been completed.

The IVA register 140 store is the base address of the code where all of the interrupt service routines are stored. This register may also be programmable by the software.

When an interrupt is generated by the software, steps are performed by both the software and the microprocessor 100 hardware. The steps that the software performs are as follows:

1) The software generates an external interrupt on vector "n".
2) The interrupt is pending in the IVR 110 and the program branches to IVA+<ext_interrupt_vector>, where the interrupt service routines reside.
3) The interrupt service routine then reads the IVR 110 to determine the vector and then branches to a program location to service the interrupt.
4) Upon completion of the processing of the interrupt, the software sets the EOI register 120 to "1" and the software then returns back to the location in the program which was being processed prior to the processing of the interrupt.

The steps that the microprocessor 100 hardware performs upon an interrupt being generated by the software are as follows:

1) Upon an interrupt n being received, the Pending register 130 is set to "1".
2) Upon the IVR 110 being read by the software, the Pending register 130 is set to "0" and the In-service register 150 is set to a "1".
3) All interrupts whose priorities are equal to or less than interrupt n are masked. That is, the microprocessor 100 ignores all interrupts having priorities which are equal to or less than interrupt n during the pendency of interrupt n.
4) Upon another interrupt being received on the same line n, the Pending register 130 is again set to "1".
5) Upon the software setting the EOI register 120 to "1" after the completion of the processing of the interrupt n, all masked interrupts which were masked on-the-fly are unmasked. That is, the microprocessor 100 will no longer ignore previously masked interrupts.

The above-noted operation of the microprocessor requires processor interrupt logic which can be quite complicated, since the processor interrupt logic must handle multiple interrupts and multiple interrupt priority levels. Accordingly, to properly test the processor interrupt logic, it is desirable to provide a multiplicity of randomly generated interrupts of different priority levels to the microprocessor so as to exercise the processor interrupt logic, particularly with regard to the handling of masked interrupts.

Accordingly, the present invention utilizes "pseudo-masked" interrupts which are interspersed with masked and unmasked interrupts to test the processor interrupt logic. Pseudo-masked interrupts are interrupts which are initially unmasked to begin with but are subsequently masked after being serviced by the microprocessor. That is, pseudo-masked interrupts are interrupts which are randomly generated and sent to a microprocessor under test to test the processor interrupt logic thereof. The pseudo-masked interrupts are handled differently in that the EOI register 120 is not set to "1" by the software upon completion of the proper processing of the pseudo-masked interrupt, but rather, the value of a lower limit of the pseudo-masked interrupts is increased to be equal to that of the pseudo-masked interrupt being serviced. However, should a received pseudo-masked interrupt be improperly serviced, that is, the pseudo-masked interrupt has a priority level which is equal to or below that of an earlier interrupt being serviced and should therefore not be serviced, then an ERROR message is generated to indicate that the processor interrupt logic has failed.

Figure 2A:
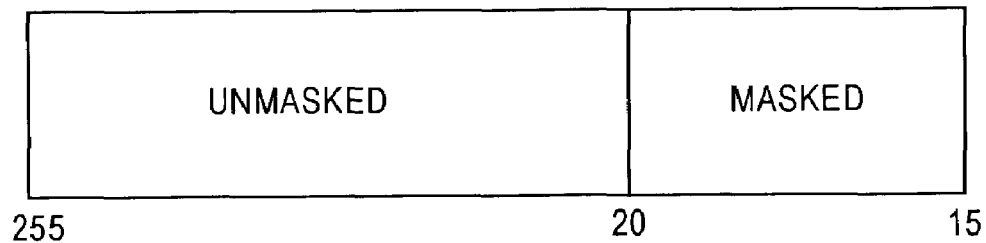
FIGS. 2A–2C illustrate the distribution of available interrupts for explaining the operation of an example embodiment of the present invention.
Figure 2B:
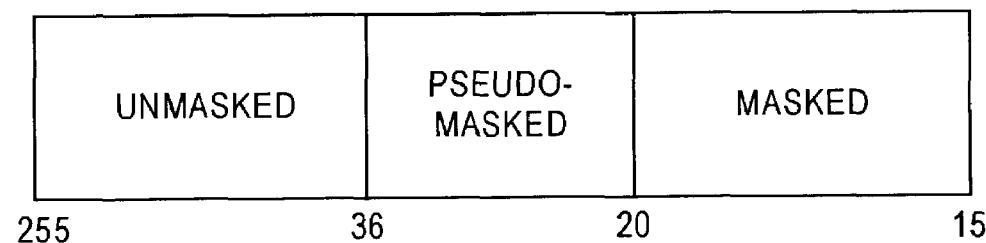
Figure 2C:
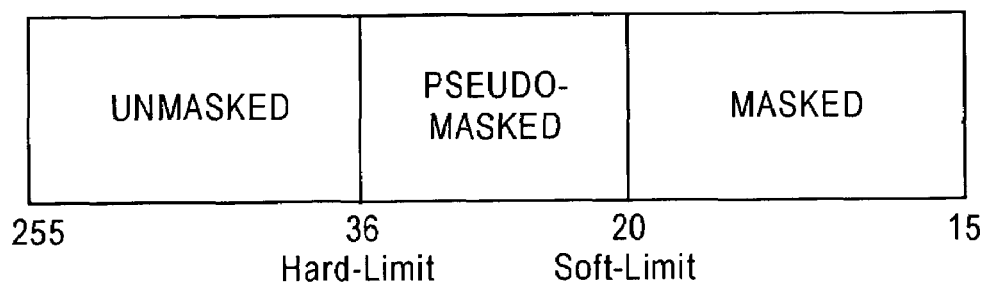

Turning to FIGS. 2A–2C, which illustrate the distribution of available interrupts, the technique in accordance with an embodiment of the present invention first selects the available range of interrupts. As noted above, interrupts 0–15 are considered to be unavailable for test purposes, since they are used for special purposes, and accordingly, interrupts 16–255 are available for test. Accordingly, interrupts 16–255 are divided into masked and unmasked interrupts. Masked interrupts are those interrupts which will never be processed by the microprocessor. These are the lower n interrupts, that is, the corresponding interrupt vectors will be below those of the pseudo-masked and unmasked interrupts.

The value n is randomly chosen and its priority class is stored in the TPR (Task Priority Register). For example, if n=20, its priority class is equal to 1 and accordingly, a 1 is stored in the TPR.

Thus, interrupts 16–31 are masked.

A set of pseudo-masked interrupts is then created. The pseudo-masked interrupts will be above the masked interrupts and below the unmasked interrupts. For example, if we randomly choose to take 16 of the lowest unmasked interrupts for designation as pseudo-masked interrupts, then, as illustrated in FIG. 2B, interrupts 16–20 are masked, interrupts 21–36 are pseudo-masked and interrupts 37–255 are unmasked. It is to be noted that the pseudo-masked interrupts are only considered to be pseudo-masked for test purposes. That is, the processor interrupt logic hardware views these interrupts as unmasked interrupts.

For testing purposes, the term "soft_limit" is defined to initially be the highest masked interrupt, that is, in this example, the soft_limit is initialized to be equal to 20. For testing purposes, the term "hard_limit" is defined to be the randomly picked highest pseudo-masked interrupt, that is, in this example, the hard_limit is initialized to be equal to 36.

The interrupts are then shuffled in their own space, that is, masked interrupts and unmasked interrupts and pseudo-masked interrupts are shuffled and placed in a queue so that the resultant interrupts will not be selected in numerical order. For example, interrupts 34, 35, 36, and 37 are shuffled so as to be ordered 36, 34, 37, and 35.

The interrupts in the above-noted queue are then sent to the microprocessor under test. In a multi-processor environment, one microprocessor may be used to send the test interrupts to the microprocessor under test. On the other hand, in a single microprocessor environment, the microprocessor under test may actually be used to send itself the test interrupts.

The following is an example of the pseudo_code for the interrupt service routine that actually tests the conditions:

```
Initial setup:
Two variables are assigned the following values:
    soft_limit = lowest pseudo-masked interrupt;
    hard_limit = highest pseudo-masked interrupt;
```

-continued

```
Inside the interrupt service routine:
{
    int_vector = read IVR; // Read the vector
    write_eoi true; // Initialize write_eoi
    if(int_vector < soft_limit) {
        ERROR("Test failed");
        StopTest( );
    }
    // Check if it is a pseudo-masked interrupt
    if((int_vector >= soft_limit) && (int_vector <= hard_limit)){
        soft_limit = int_vector;
        write_eoi = false;
    }
    // Process interrupt:
    if(write_eoi) {
        WriteEOI(1); // Set EOI to indicate interrupt is finished
    }
}
```

That is, if the processor under test receives an interrupt between the hard_limit and interrupt 255, (an unmasked interrupt), then the processor services that interrupt and then sets the EOI to indicate that the interrupt has been serviced. If the processor under test receives an interrupt between the hard_limit and the soft_limit, (a pseudo-masked interrupt), then the processor services that interrupt but does not set the EOI to indicate that the interrupt has been serviced, but rather increases, that is, increments the value of the soft_limit toward the hard_limit. More particularly, the value of the soft_limit is set to be equal to that of the pseudo-masked interrupt being serviced. If the processor under test receives an interrupt below the soft_limit, then the processor should ignore this interrupt. However, if the processor under test services an interrupt below the soft_limit, then an ERROR message is generated since the processor has failed the test.

It is to be noted that the technique for testing processor interrupt logic of a microprocessor in accordance with an embodiment of the present invention does not generate a PASSED TEST message if the processor interrupt logic is operating properly but rather a test passage is implied by the lack of an ERROR message being generated.

This process continues repeatedly to ensure that the interrupt logic of the processor under test is operating properly. If the soft_limit value is increased until it is equal to the hard_limit value, this is an indication that the interrupt logic of the processor under test has been operating properly.

In order for the testing technique to be closed ended rather than open ended, a test instruction queue of a predetermined size can be arranged so as to have, for example, 128 instructions with the interrupts interspersed therebetween. In addition, an interrupt counter arrangement may count up the total number of interrupts sent to the microprocessor under test as well as counting the number of interrupts serviced by the microprocessor.

Figure 3A:
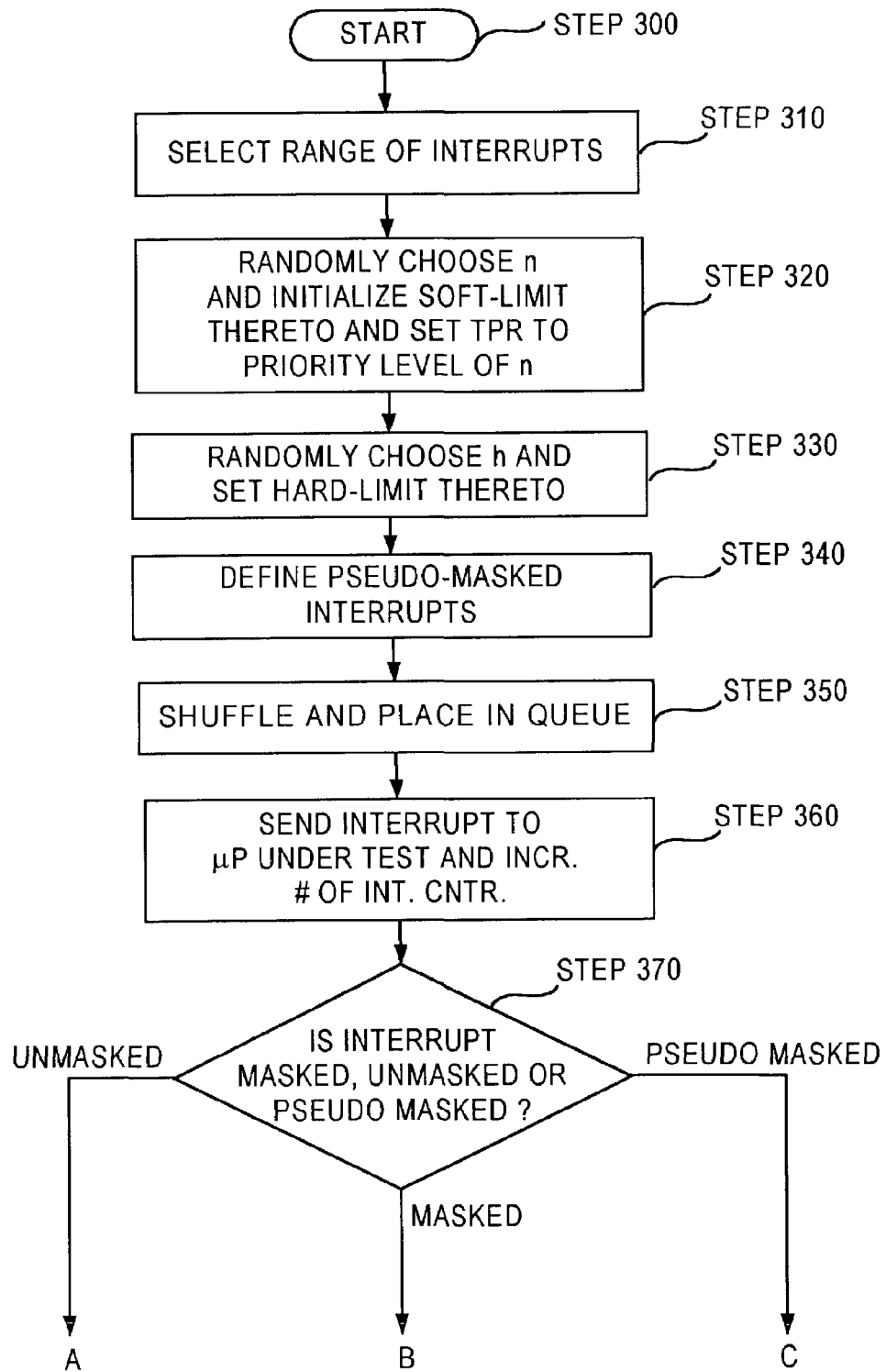
FIGS. 3A–3B together form a flowchart for use in explaining the operation of an example embodiment of the present invention.
Figure 3B:
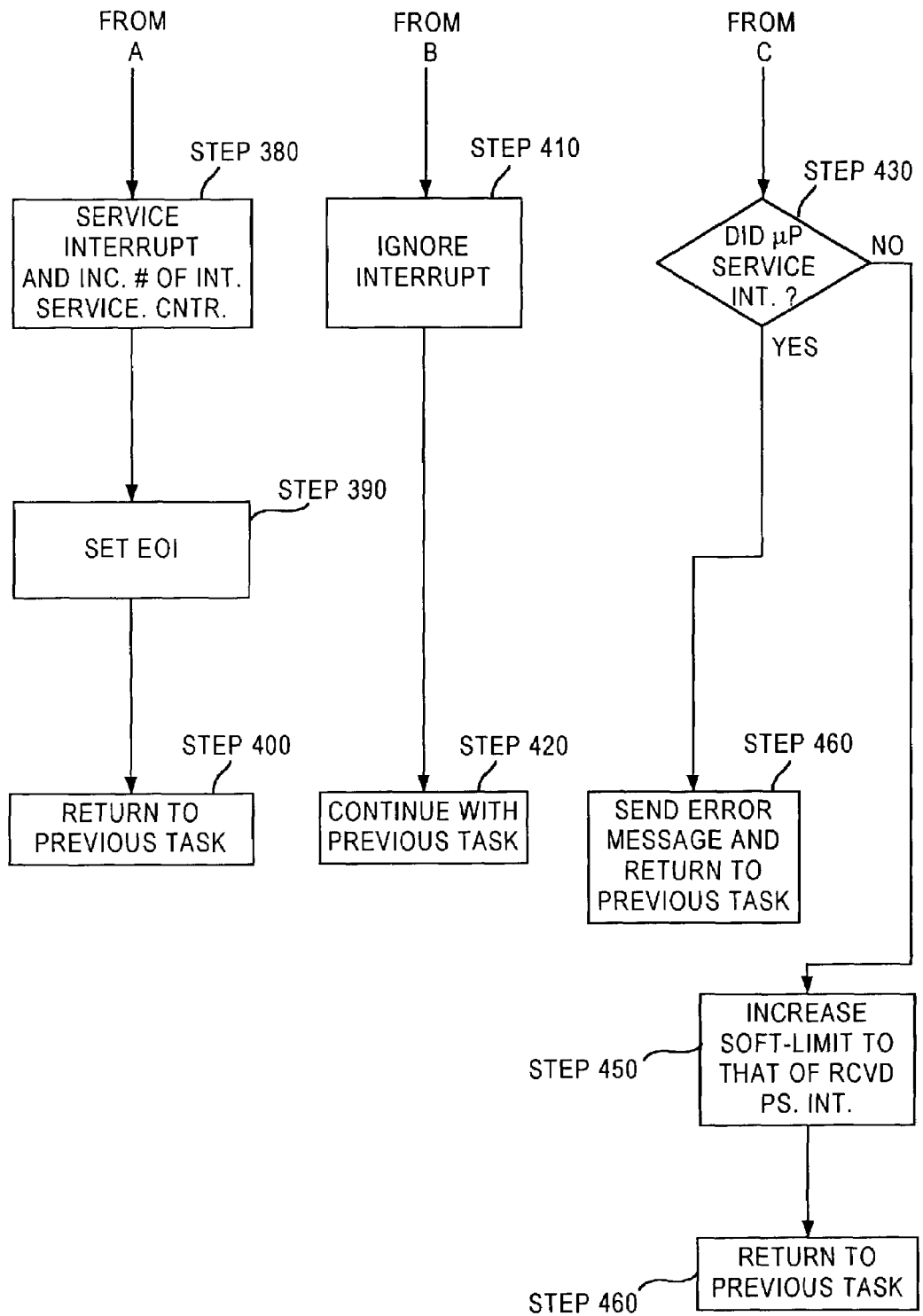

FIGS. 3A–3B together form a flowchart for use in explaining the operation of an example embodiment of the present invention. As illustrated in FIG. 3, upon starting the technique for testing the processor interrupt logic of a microprocessor in accordance with an example embodiment of the present invention in step 300, the technique proceeds to step 310 where the range of interrupts to be tested is selected.

The technique then proceeds to step 320 where an interrupt n within the selected range is randomly chosen, and a soft_limit value is initialized to be equal to the chosen interrupt n and set TPR (Task Priority Register) to priority level of interrupt n.

The technique then proceeds to step 330 where an interrupt h between the uppermost limit of the selected range and the chosen interrupt n is randomly chosen, and a hard_limit value is set to be equal to the chosen interrupt h.

The technique then proceeds to step 340 where the pseudo-masked interrupts are defined to be those interrupts between the hard_limit value and the soft_limit value.

The technique then proceeds to step 350 where all of the interrupts (that is, masked, unmasked, and pseudo-masked) are shuffled and placed in a queue so as to not be in numerical order.

The technique then proceeds to step 360 where the first interrupt in the queue is selected and sent to the microprocessor under test. In addition, a counter which counts the number of interrupts sent is incremented from its initial value of 0.

The technique then proceeds to step 370 where a determination is made as to whether the interrupt sent to the microprocessor under test is masked, unmasked, or pseudo-masked.

If it has been determined in step 370 that the interrupt sent to the microprocessor under test is an unmasked interrupt, then the technique proceeds to step 380 where the interrupt is serviced. In addition, a counter which cost the number of interrupts serviced is incremented from its initial value of 0.

The technique then proceeds to step 390 where the EOI (End Of Interrupt) register is set so as to indicate the end of an interrupt routine. The setting of the EOI register causes the microprocessor to release all of the interrupts that were masked on-the-fly.

The technique then proceeds to step 400 where the microprocessor returns to the previous task which it was performing just prior to the receipt of the interrupt.

Alternatively, if it has been determined in step 370 that the interrupt sent to the microprocessor under test is a masked interrupt, then the microprocessor ignores the interrupt in step 410 and the technique proceeds to step 420 where the microprocessor continues with the previous task which it was performing just prior to the receipt of the interrupt.

Further alternatively, if it has been determined in step 370 that the interrupt sent to the microprocessor under test is a pseudo-masked interrupt, then the technique proceeds to step 430 where a determination is made as to whether the microprocessor under test has serviced the interrupt.

If it has been determined in step 430 that the microprocessor under test has improperly serviced the pseudo-masked interrupt, then the technique proceeds to step 440 where an ERROR message is sent and the microprocessor under test then proceeds to return to the previous task which it was performing just prior to the receipt of the interrupt.

If it has been determined in step 430 that the microprocessor under test did not service the pseudo-masked interrupt, then the technique proceeds to step 450 where the soft_limit is increased to that of the received pseudo-masked interrupt and the technique then proceeds to step 460 where the microprocessor under test proceeds to return to the previous task which it was performing just prior to the receipt of the interrupt.

The above-noted technique subsequently returns to step 360 where the next interrupt in the queue is sent to the microprocessor under test. In order to have a closed limit test, and end of test message may be generated when the counter incremented in step 360 reaches a predetermined value.

By the above-noted technique, the absence of the generation of an ERROR message is an indication that the processor interrupt logic of the microprocessor under test is operating properly. Since a relatively large number of interrupts are generated, this technique allows for the rigorous testing of the processor interrupt logic of the microprocessor under test.

This concludes the detailed description. Although the present invention has been described above with a reference to an illustrative embodiment thereof, a should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

For example, the illustrative embodiment of the present invention discussed above refers to a microprocessor having 256 interrupts and 16 interrupt levels. However, the present invention is not limited thereto in that any number of interrupts and interrupt levels may be accommodated by the present invention. Furthermore, the values chosen for the hard_limit and soft_limit in the illustrative embodiment of the present invention discussed above are merely for exemplary purposes and in fact are randomly chosen. Still furthermore, it is noted that the present invention may accommodate a single microprocessor self testing its processor interrupt logic or may accommodate a multi-microprocessor arrangement in which one microprocessor is used to test the processor interrupt logic of another microprocessor.

What is claimed it is:

1. A method of testing processor interrupt logic of a microprocessor under test, the method comprising:
   generating a plurality of interrupts having different interrupt priority levels;
   selecting interrupts from the plurality of interrupts and sending them one at a time to the microprocessor under test;
   determining if the microprocessor under test has serviced the interrupt just sent to it, and if so,
   determining the priority interrupt level of the interrupt just sent to it and determining the priority interrupt level of a previously received interrupt being serviced just prior to the receipt of the interrupt just sent to it; and
   determining that there has been a failure of the processor interrupt logic of the microprocessor under test if the priority interrupt level of the interrupt just sent to it is less than or equal to the priority interrupt level of a previously received interrupt being serviced just prior to the receipt of the interrupt just sent to it.

2. The method of claim 1, wherein generating a plurality of interrupts having different interrupt priority levels comprises:
   generating a plurality of masked interrupts, a plurality of pseudo-masked interrupts, and a plurality of unmasked interrupts, wherein the plurality of pseudo-masked interrupts all have interrupt priority levels higher than those of the plurality of masked interrupts and wherein the plurality of unmasked interrupts all have interrupt priority levels higher than those of the plurality of pseudo-masked interrupts.

3. The method of claim 2, wherein generating a plurality of interrupts having different interrupt priority levels further comprises shuffling the plurality of masked interrupts, the plurality of pseudo-masked interrupts and the plurality of unmasked interrupts together so as to place them in a random order in a queue.

4. The method of claim 3, wherein selecting interrupts from the plurality of interrupts comprises selecting the interrupts from the queue in order so as to randomly select interrupts having different priority interrupt levels.

5. The method of claim 2, wherein the plurality of masked interrupts are defined to be those interrupts between a preselected lowest interrupt number and a randomly chosen soft_limit interrupt number and wherein the plurality of pseudo-masked interrupts are defined to be those interrupts above the soft_limit interrupt number and less than or equal to a randomly chosen high_limit interrupt number and wherein the plurality of unmasked interrupts are defined to be those interrupts above the high_limit interrupt number and a preselected highest interrupt number.

6. The method of claim 3, wherein the plurality of masked interrupts are defined to be those interrupts between a preselected lowest interrupt number and a randomly chosen soft_limit interrupt number and wherein the plurality of pseudo-masked interrupts are defined to be those interrupts above the soft_limit interrupt number and less than or equal to a randomly chosen high_limit interrupt number and wherein the plurality of unmasked interrupts are defined to be those interrupts above the high_limit interrupt number and a preselected highest interrupt number.

7. The method of claim 4, wherein the plurality of masked interrupts are defined to be those interrupts between a preselected lowest interrupt number and a randomly chosen soft_limit interrupt number and wherein the plurality of pseudo-masked interrupts are defined to be those interrupts above the soft_limit interrupt number and less than or equal to a randomly chosen high_limit interrupt number and wherein the plurality of unmasked interrupts are defined to be those interrupts above the high_limit interrupt number and a preselected highest interrupt number.

8. The method of claim 5, further comprising increasing the soft_limit to the interrupt number of the interrupt just sent to the microprocessor under test upon a determination that the microprocessor under test has failed to service the interrupt just sent to it.

9. The method of claim 6, further comprising increasing the soft_limit to the interrupt number of the interrupt just sent to the microprocessor under test upon a determination that the microprocessor under test has failed to service the interrupt just sent to it.

10. The method of claim 7, further comprising increasing the soft_limit to the interrupt number of the interrupt just sent to the microprocessor under test upon a determination that the microprocessor under test has failed to service the interrupt just sent to it.

11. A program storage device readable by a machine, tangibly embodying a program of instructions executable by the machine to perform a method of testing processor interrupt logic of a microprocessor under test, the method comprising:
  generating a plurality of interrupts having different interrupt priority levels;
  selecting interrupts from the plurality of interrupts and sending them one at a time to the microprocessor under test;
  determining if the microprocessor under test has serviced the interrupt just sent to it, and if so,
  determining the priority interrupt level of the interrupt just sent to it and determining the priority interrupt level of a previously received interrupt being serviced just prior to the receipt of the interrupt just sent to it; and
  determining that there has been a failure of the processor interrupt logic of the microprocessor under test if the priority interrupt level of the interrupt just sent to it is less than or equal to the priority interrupt level of a previously received interrupt being serviced just prior to the receipt of the interrupt just sent to it.

12. The program storage device of claim 11, wherein generating a plurality of interrupts having different interrupt priority levels comprises:
  generating a plurality of masked interrupts, a plurality of pseudo-masked interrupts, and a plurality of unmasked interrupts, wherein the plurality of pseudo-masked interrupts all have interrupt priority levels higher than those of the plurality of masked interrupts and wherein the plurality of unmasked interrupts all have interrupt priority levels higher than those of the plurality of pseudo-masked interrupts.

13. The program storage device of claim 12, wherein generating a plurality of interrupts having different interrupt priority levels further comprises shuffling the plurality of masked interrupts, the plurality of pseudo-masked interrupts and the plurality of unmasked interrupts together so as to place them in a random order in a queue.

14. The program storage device of claim 13, wherein selecting interrupts from the plurality of interrupts comprises selecting the interrupts from the queue in order so as to randomly select interrupts having different priority interrupt levels.

15. The program storage device of claim 12, wherein the plurality of masked interrupts are defined to be those interrupts between a preselected lowest interrupt number and a randomly chosen soft_limit interrupt number and wherein the plurality of pseudo-masked interrupts are defined to be those interrupts above the soft_limit interrupt number and less than or equal to a randomly chosen high_limit interrupt number and wherein the plurality of unmasked interrupts are defined to be those interrupts above the high_limit interrupt number and a preselected highest interrupt number.

16. The program storage device of claim 13, wherein the plurality of masked interrupts are defined to be those interrupts between a preselected lowest interrupt number and a randomly chosen soft_limit interrupt number and wherein the plurality of pseudo-masked interrupts are defined to be those interrupts above the soft_limit interrupt number and less than or equal to a randomly chosen high_limit interrupt number and wherein the plurality of unmasked interrupts are defined to be those interrupts above the high_limit interrupt number and a preselected highest interrupt number.

17. The program storage device of claim 14, wherein the plurality of masked interrupts are defined to be those interrupts between a preselected lowest interrupt number and a randomly chosen soft_limit interrupt number and wherein the plurality of pseudo-masked interrupts are defined to be those interrupts above the soft_limit interrupt number and less than or equal to a randomly chosen high_limit interrupt number and wherein the plurality of unmasked interrupts are defined to be those interrupts above the high_limit interrupt number and a preselected highest interrupt number.

18. The program storage device of claim 15, the method further comprising increasing the soft_limit to the interrupt number of the interrupt just sent to the microprocessor under test upon a determination that the microprocessor under test has failed to service the interrupt just sent to it.

19. The program storage device of claim 16, the method further comprising increasing the soft_limit to the interrupt number of the interrupt just sent to the microprocessor under test upon a determination that the microprocessor under test has failed to service the interrupt just sent to it.

20. The program storage device of claim 17, the method further comprising increasing the soft_limit to the interrupt number of the interrupt just sent to the microprocessor under test upon a determination that the microprocessor under test has failed to service the interrupt just sent to it.

21. A computer program product comprising:
  a computer usable medium having computer readable program code means embodied in the medium for testing processor interrupt logic of a microprocessor under test, the computer program product having:
  a computer readable program code means to cause a computer to generate a plurality of interrupts having different interrupt priority levels;
  a computer readable program code means to cause the computer to select interrupts from the plurality of interrupts and to send them one at a time to the microprocessor under test;
  a computer readable program code means to cause the computer to determine if the microprocessor under test has serviced the interrupt just sent to it, and if so,
  a computer readable program code means to cause the computer to determine the priority interrupt level of the interrupt just sent to it and to determine the priority interrupt level of a previously received interrupt being serviced just prior to the receipt of the interrupt just sent to it; and
  a computer readable program code means to cause the computer to determine that there has been a failure of the processor interrupt logic of the microprocessor under test if the priority interrupt level of the interrupt just sent to it is less than or equal to the priority interrupt level of a previously received interrupt being serviced just prior to the receipt of the interrupt just sent to it.

22. The computer program product of claim 21, wherein generating a plurality of interrupts having different interrupt priority levels comprises:
  generating a plurality of masked interrupts, a plurality of pseudo-masked interrupts, and a plurality of unmasked interrupts, wherein the plurality of pseudo-masked interrupts all have interrupt priority levels higher than those of the plurality of masked interrupts and wherein the plurality of unmasked interrupts all have interrupt priority levels higher than those of the plurality of pseudo-masked interrupts.

23. The computer program product of claim 22, wherein generating a plurality of interrupts having different interrupt priority levels further comprises shuffling the plurality of masked interrupts, the plurality of pseudo-masked interrupts and the plurality of unmasked interrupts together so as to place them in a random order in a queue.

24. That computer program product of claim 23, wherein selecting interrupts from the plurality of interrupts comprises selecting the interrupts from the queue in order so as to randomly select interrupts having different priority interrupt levels.

25. The computer program product of claim 22, wherein the plurality of masked interrupts are defined to be those interrupts between a preselected lowest interrupt number and a randomly chosen soft_limit interrupt number and wherein the plurality of pseudo-masked interrupts are defined to be those interrupts above the soft_limit interrupt number and less than or equal to a randomly chosen high_limit interrupt number and wherein the plurality of unmasked interrupts are defined to be those interrupts above the high_limit interrupt number and a preselected highest interrupt number.

26. The computer program product of claim 23, wherein the plurality of masked interrupts are defined to be those interrupts between a preselected lowest interrupt number and a randomly chosen soft_limit interrupt number and wherein the plurality of pseudo-masked interrupts are defined to be those interrupts above the soft_limit interrupt number and less than or equal to a randomly chosen high_limit interrupt number and wherein the plurality of unmasked interrupts are defined to be those interrupts above the high_limit interrupt number and a preselected highest interrupt number.

27. The computer program product of claim 24, wherein the plurality of masked interrupts are defined to be those interrupts between a preselected lowest interrupt number and a randomly chosen soft_limit interrupt number and wherein the plurality of pseudo-masked interrupts are defined to be those interrupts above the soft_limit interrupt number and less than or equal to a randomly chosen high_limit interrupt number and wherein the plurality of unmasked interrupts are defined to be those interrupts above the high_limit interrupt number and a preselected highest interrupt number.

28. The computer program product of claim 25, wherein the computer readable program code means for testing processor interrupt logic of a microprocessor under test further comprises increasing the soft_limit to the interrupt number of the interrupt just sent to the microprocessor under test upon a determination that the microprocessor under test has failed to service the interrupt just sent to it.

29. The computer program product of claim 26, wherein the computer readable program code means for testing processor interrupt logic of a microprocessor under test further comprises increasing the soft_limit to the interrupt number of the interrupt just sent to the microprocessor under test upon a determination that the microprocessor under test has failed to service the interrupt just sent to it.

30. The computer program product of claim 27, wherein the computer readable program code means for testing processor interrupt logic of a microprocessor under test further comprises increasing the soft_limit to the interrupt number of the interrupt just sent to the microprocessor under test upon a determination that the microprocessor under test has failed to service the interrupt just sent to it.

31. The method of claim 1, further comprising generating an ERROR output upon determining that there has been a failure of the processor interrupt logic of the microprocessor under test.

32. The program storage device of claim 11, the method further comprising generating an ERROR output upon determining that there has been a failure of the processor interrupt logic of the microprocessor under test.

33. The computer program product of claim 21, wherein the computer readable program code means for testing processor interrupt logic of a microprocessor under test further comprises generating an ERROR output upon determining that there has been a failure of the processor interrupt logic of the microprocessor under test.

* * * * *